United States Patent
Hanna, Jr.

[11] 3,870,992
[45] Mar. 11, 1975

[54] RADAR SYSTEM

[75] Inventor: Drexel W. Hanna, Jr., Warminster, Pa.

[73] Assignee: AII Systems, Moorestown, N.J.

[22] Filed: Apr. 26, 1972

[21] Appl. No.: 247,568

[52] U.S. Cl. ............................................. 343/5 DP
[51] Int. Cl. ............................................... G01s 9/02
[58] Field of Search .................................. 343/5 DP

[56] References Cited
UNITED STATES PATENTS

| | | | |
|---|---|---|---|
| 3,518,674 | 6/1970 | Moorehead et al. | 343/112 TC |
| 3,653,044 | 3/1972 | Breeze | 343/5 DP X |
| 3,680,095 | 7/1972 | Evans | 343/5 DP X |
| 3,689,921 | 9/1972 | Berry | 343/5 DP X |

Primary Examiner—Malcolm F. Hubler
Attorney, Agent, or Firm—Morton C. Jacobs

[57] ABSTRACT

In a radar system especially suitable for collision avoidance of ships at sea, the azimuth reporting resolution is improved by transmitting the radar signals so as to occur a plurality of times during the angle of beamwidth of a rotating radar antenna, and comparing the resulting echoes of successive radar signals that occur at time periods corresponding to various ranges and identifying as target signals only those of the echoes in the respective range periods occurring for a certain plurality of scan cycles within the antenna beamwidth angle. The bandwidth requirements of the system for communication from a plurality of such mobile stations to a central station are reduced by digitizing at the ships the range and azimuth data corresponding to said identified target signals and by treating as valid target signals those echoes that are repeated over successive frame cycles, and by reporting to the central station only such target information. Those echoes that are not repeated over successive sweep cycles are treated as non-target information or false alarms. A noise threshold for the detection of echo signals at the input is adjusted depending upon the number of false alarms (non-repeated target signals) in a frame. Only a limited number of targets at any azimuth location are reported. If at some point the number of valid target signals in an antenna frame matches some predetermined value, then the target data for only that first portion of the frame are reported to the central station. During the succeeding frame, the report to the central station starts at the azimuth limit where the previous frame report left off.

3 Claims, 11 Drawing Figures

RADAR SYSTEM

BACKGROUND OF THE INVENTION

This invention relates to a radar system, and particularly to one having suitability to provide collision avoidance information for a large number of mobile stations such as ships at sea. In a collision avoidance system in which each ship has its own radar to pick up targets of surrounding regions and reports the targets to a central control, the bandwidth requirements of a common communications channel time shared by all of the ships may become exceedingly great. Thus it is desirable to implement the radar system at each mobile station so as to reduce the bandwidth requirements as much as possible. It is also desirable to have an optimum azimuth reporting resolution for a given antenna beamwidth. The radar system should be one in which the probability of false detection is low and the detection of true targets is favorable, especially where the target is on a collision course. It is also desirable to be able to operate the radar from remote locations as by means of an operator at a central processor.

Accordingly, it is among the objects of this invention to provide a new and improved radar system.

Another object is to provide a new and improved radar system which is especially adapted for collision avoidance.

Another object is to provide a new and improved radar system suitable for collision avoidance and having one or more of the following characteristics: practical bandwidth requirements for the transmission of data, optimum azimuth resolution, target signals are effectively detected and the probability of false detection is reduced, and the radar system may be operated at locations remote from the mobile stations.

SUMMARY OF THE INVENTION

In accordance with an embodiment of this invention, in a radar system having an antenna with a rotating beam, the azimuth and range of the target are measured by transmitting the radar signals repetitively during successive scan cycles which occur a plurality of times during the angle of beamwidth of the radar antenna, and comparing the resulting echo signals occurring at corresponding range time periods to identify as "hits" those of the echo signals occurring in the corresponding range time periods for a certain plurality of scan cycles within the antenna beamwidth angle. Thereby, the azimuthal resolution is made to be less than the antenna beamwidth. The azimuth and range of each hit are assigned digitally coded values, and the identified hit data in one frame are compared with the corresponding hit data during the preceding frame. A hit is identified as a "valid target" if it has, in successive frames, either the same azimuth and range, or the same azimuth but a closing range. All other hits are rejected as spurious. A threshold for detecting echo signals is adjusted in level depending upon whether the number of spurious detections exceeds certain predetermined values related to the memory capacity and data transmission capability of the system. The digitized range and azimuth addresses for each valid target signal are transmitted on a time sharing basis via a communications channel to a central control station. This station processes the target data of all of the mobile stations to monitor the relation of the mobile stations to each other, thereby to establish indications of collision dangers and to supply warnings to the individual mobile stations as may be appropriate. The number of valid target signals reported for any particular azimuth is limited, and only the closest targets are transmitted to the central control. In normal operation, all of the valid target signals within an antenna cycle frame are reported, except in special circumstances where a high density target condition exists. Then a memory "full" condition detects that high density, and the system operates adaptively first, to discontinue further target detection during the remainder of the frame, second, to store a value corresponding to the azimuth of the beam where the "full" condition occurred and, third, to transmit only the limited number of targets corresponding to the first sector of the antenna frame. During the succeeding frame, target detection commences only when the beam azimuth matches that corresponding to the value stored from the previous frame. Target detection continues until this succeeding frame terminates or until the number of valid target signals matches the predetermined value, in which case the above steps repeat. Thereby, the target data of a plurality of sectors are developed over a plurality of successive frames, which, when combined, form the target data from all azimuths surrounding the mobile station.

BRIEF DESCRIPTION OF THE DRAWING

The foregoing and other objects of this invention, the various features thereof, as well as the invention itself, will be more fully understood from the following description, when read together with the accompanying drawing, in which.

In the drawing, corresponding parts are referenced throughout by similar numerals.

DESCRIPTION OF A PREFERRED EMBODIMENT

Figure 1:
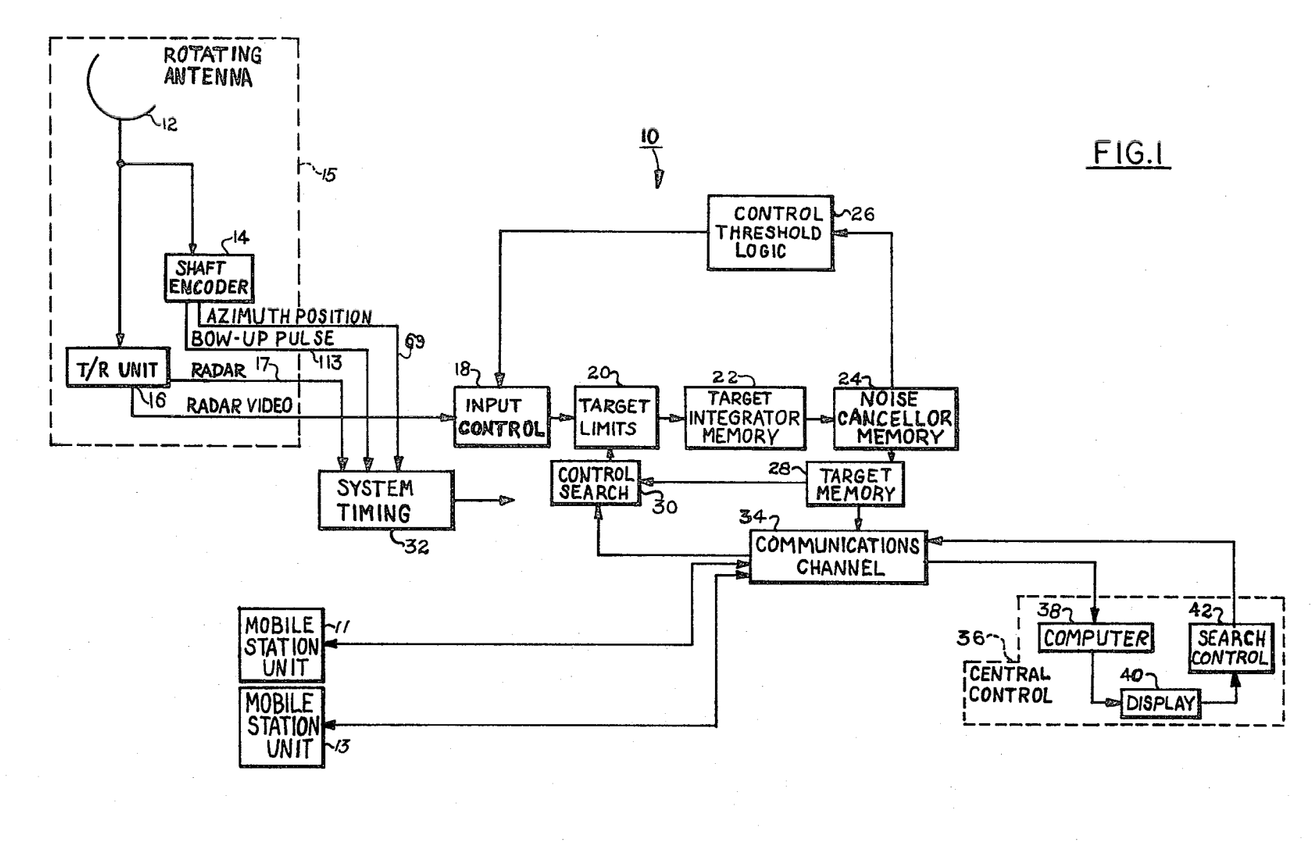
FIG. 1 is a schematic block diagram of a radar system embodying this invention, consisting of a plurality of radar units at moble stations and a central control station.

In the overall system of FIG. 1, a plurality of mobile stations 10, 11 and 13 are shown, each of which is similarly constructed for developing radar data and communicating it via a common communications channel 34 to a central control 36 where the data is processed by means of a computer for display on an appropriate display device. These mobile stations may be substantially identical and installed, for example, aboard ships, and the overall data collected and interrelated for a large number of such ships; for example, the system herein described may be designed to provide data for hundreds of such mobile stations, and the processing of such data may be performed to provide indications of threatened collisions of ships bearing on the same course. This invention is not limited to any particular type of mobile station and may be appropriately designed for an aircraft collision avoidance scheme, and for other applications as well.

Each of the radar unit stations is substantially alike, and the following description of a station 10 as shown in FIG. 1 applies equally well to the others. A radar set 15 includes a rotating radar antenna of a conventional type (or any other suitable scanning antenna), from which, by means of a conventional shaft encoder 14, azimuth position data and, for each cycle or frame of antenna rotation, a zero reference signal (which for a ship would be a bow-up pulse) are provided on appropriate signal lines 63 and 113, respectively. A conventional transmit-receive unit 16 generates and transmits radar pulses at an appropriate pulse repetition frequency and receives back echo signals which are developed as radar video signals which are supplied to an input control unit 18. The radar pulse on line 17 is supplied together with the signals on lines 69 and 113 to a system timing unit 32 which also receives a signal representative of the duration of the radar pulse. The timing unit 32 supplies control and clock signals for the remainder of the system as described hereinafter.

The input control 18 normalizes the radar video signal, determines the threshold level at which the echo signals are detected, and provides detection of said signals. The radial limits of the target area being searched at a given azimuth are established by gate 20 which receives the detected echo signals from input control 18 and passes those signals falling within the set appropriate limits to a signal analysis sector of the unit which includes the target integrator memory 22. This memory 22 analyzes the detected echo signals for successive "hits" and "misses" in a series of related range bins, stores the analysis results, and digitizes the azimuth and range values of the hits. The resulting signals are passed to a noise cancellor memory 24, which includes appropriate logic for reducing from the information developed thus far spurious hit signals developed due to noise and the like. The logic of the noise cancellor 24 and of logic 26 for controlling the echo signal detection threshold ensures that a fixed number of spurious hits are reported for each frame of the rotating antenna 12. The noise cancellor 24 operates on the principle that a hit signal is treated as a "valid target" signal which it is determined that an echo signal corresponding to the same azimuth and range as said hit signal was detected in the previous frame; that is, valid targets are those having the same azimuth and range coordinates in successive scanning frames.

The valid target data is stored in a target memory 28 with a limit being placed on the number of targets that are stored. When that "memory full" limit is reached, say 50 targets are stored in memory 28, processing of the hit data for the current frame is terminated, and the azimuth at which the "full" condition occurred is established in the control search logic 30, which sets the starting azimuth limit for target analysis on the next frame. The target data established in memory 28 is supplied via the communications channel with certain other parameters developed by the radar unit. This data is transmitted on a multiplex basis with corresponding data from the other stations 11 and 13 to a central control 36, where the computer 38 analyzes the data for possible collision and other relationships among the various mobile stations and provides a display 40 of the overall relationship of the mobile stations. In addition, collision dangers are detected, appropriate warnings are transmitted to the mobile station, and the search controls 42 are developed, either automatically or by means of operator control, and transmitted via communications channel 34 to the individual mobile stations. The mobile stations each include a display or printer device (not shown) for collision warnings and instructions for avoidance from central control 30 so that the individual stations can be directed to avoid their respective dangers of collision. The search controls 42 are also used under operator control at the central unit 36 to send parameters on azimuth and range to limit the field of radar scanning to avoid areas that are high in clutter or otherwise high in unwanted targets, such as the shore line.

Figure 2:
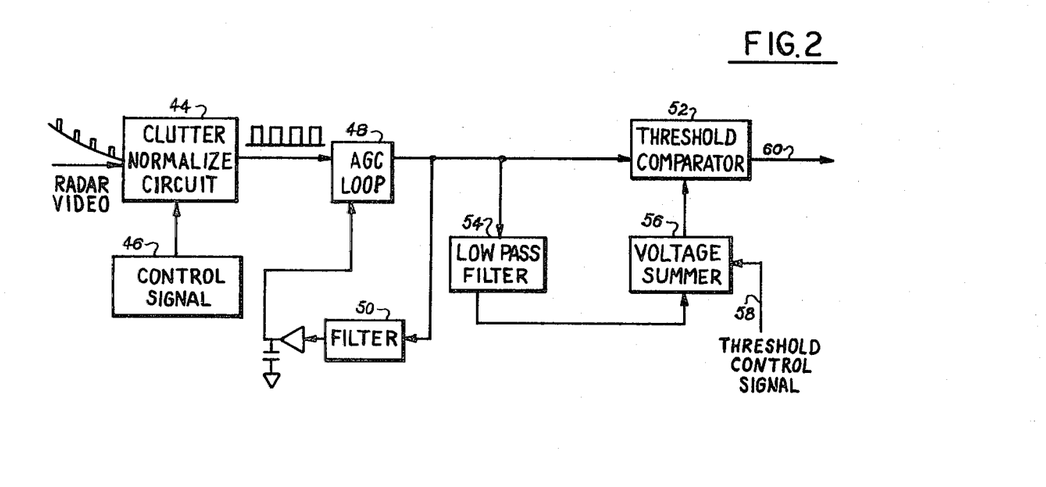
FIG. 2 is a schematic block diagram of the input control portion of the radar unit for a mobile station in the system of FIG. 1.

The input control circuits of FIG. 2 are designed to normalize the noise level of the radar and video signals and to provide an appropriate threshold for detecting the echo signals. Various forms of input circuits may be used to eliminate clutter and to normalize the threshold; one suitable form is illustrated in FIG. 2. The clutter normalizing circuit herein performs an open-loop operation, based on the assumption that the clutter noise amplitude decreases as a function of the third power of the range which can be removed by a corresponding function provided by the control signal circuit 46. The second control function, which is a closed-loop operation, is an automatic gain control loop 48 operating on the noise signal with a filter and time constant circuit in the feedback loop. This AGC operation is based upon the assumption that for the greater part of the signal processing, noise is the only signal available and the time constants of this control loop are such that the target pulses, when they do appear, will not be removed by the loop. The echo pulses passed by the AGC loop 48 are supplied to a threshold comparator 52 which determines if the video signal coming into it is greater than a particular threshold amplitude. This detection threshold is derived from the sum in circuit 56 of two components, first, the average value of the noise signal at the input of the comparator as determined by means of a low pass filter 54 which receives the comparator input and, second, a threshold control signal supplied on a line 58. The latter signal provides a fixed constant offset for the average noise signal value. The signal on line 58 is determined by the hit and target analysis taking place in the remainder of the system. The output of the comparator 52 is a binary signal which has a value of "1" representing a "detected echo" when the video signal exceeds the threshold and a binary value of "0" representing a "miss" when the signal amplitude does not exceed the threshold.

Figure 10:
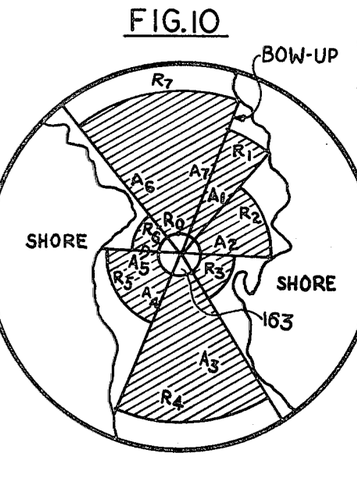
FIG. 10 is a schematic diagram used in explaining still another aspect of this invention.

The signals on line 60 from the comparator 52 are applied to the track limits gate 62 (see FIG. 3) which, under control signals supplied to line 186, passes those detected echo signals corresponding to targets with azimuth and range coordinates within certain preset limits, such as those indicated by the diagrammatic sketch of FIG. 10, and explained hereinafter. The detected echo signals that are passed by gate 62 are supplied to target integrator memory 64 which provides a matrix for storing the binary signals of detected echoes and misses in an appropriate format. One form that is found suitable is that of a memory matrix (say 256 columns by 6 rows in size) in which the columns represent azimuth and the rows represent range values. In each column or azimuth position, there are 256 range bins, and 6 successive azimuth positions in each row. With those parameters, the matrix contains at the completion of each beam sweep a set of 256 words, each of 6 bits, with each such word corresponding to a particular range of the sweep of 6 successive different azimuths.

Figure 3:
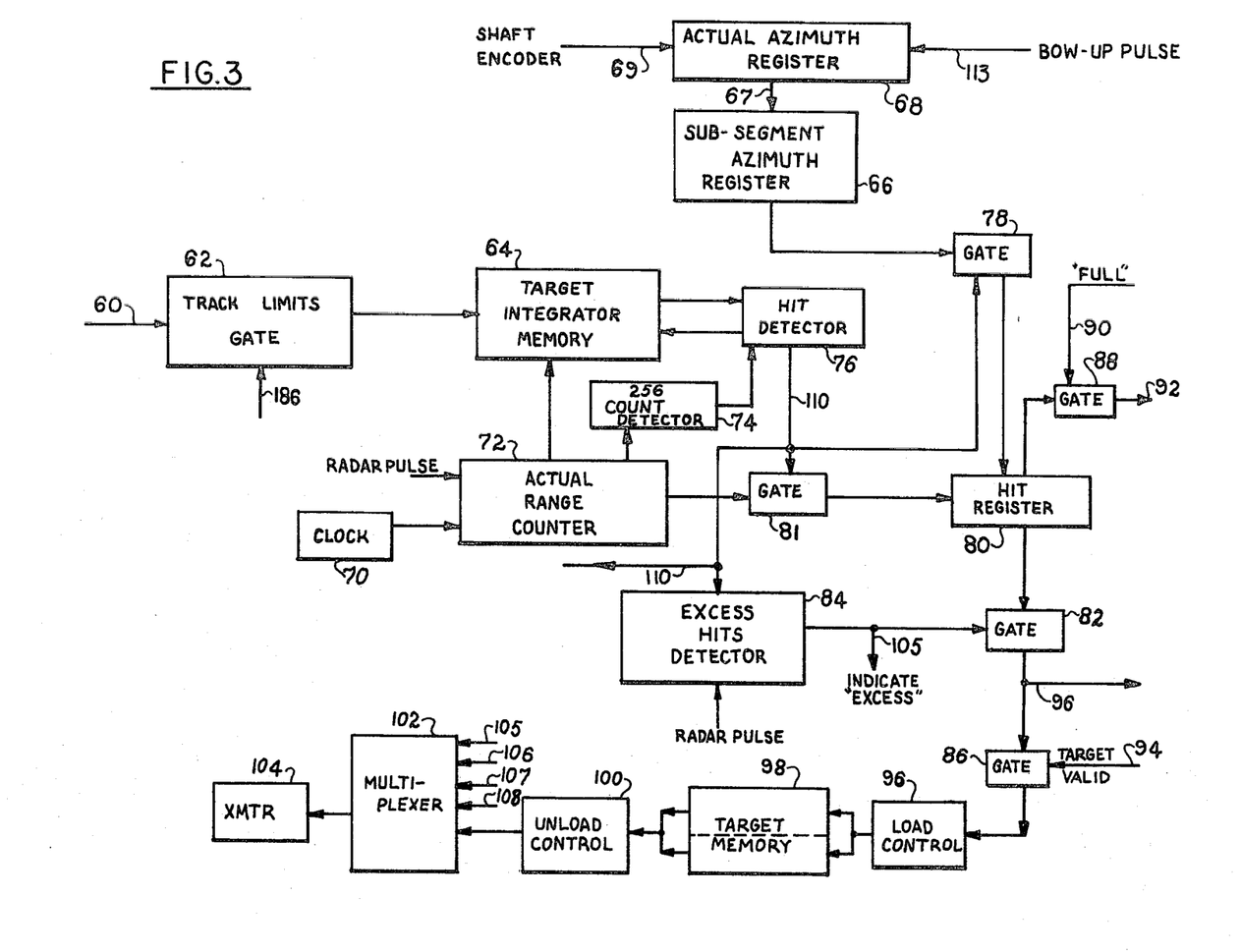
FIG. 3 is a schematic block diagram of the target integrator memory and related portions of the radar unit of FIG. 1.

The azimuth is established by a shaft encoder 14 (FIG. 1) whose output on line 69 is supplied to a register 68 to store a binary number corresponding to the actual azimuth of the antenna at each instant of time; this register receives the bow-up pulse on line 113 and is reset thereby. The binary number established in register 68 is passed via line 67 to another register 66, which includes logic for subtracting a binary value equal to 3 from the actual azimuth value established in register 68; thereby this register 66 is used to establish a sub-segment azimuth, as explained hereinafter. A clock generator 70 operates at a suitably fast rate and is appropriately divided down to derive a clock or timing pulse which relates appropriately to the radar pulse transmitted by the antenna. This timing pulse developed from the clock generator 70 defines the range bin size and is supplied to a counter 72 which counts these pulses to provide an actual range value in binary. The counter 72 counts through 256 counts corresponding to the different range bins, starting from zero count established by the radar pulse at the beginning of each frame. The counter 72 recycles upon reaching the count of 256, which is detected by circuit 74, which thereupon provides a control pulse for a hit detector 76 enabling that circuit.

As counter 72 counts timing pulses up to 256 for the first time during a sweep, it supplies signals to memory 64 to write the detected echo signals into the proper range bin positions of the first matrix column in target integrator 64, so that all of the detected echo signals for a current sweep are in that column. The corresponding signals for the next previous sweep are in the second column, and so on for those of the other previous sweeps, up to 6 sweeps for this embodiment. When counter 72 reaches count 256 for the first time during a sweep, count detector 74 enables hit detector 76, and integrator memory 64 is effective to successively remove the signals of the entire row or 6-bit word corresponding to the binary range count as established in counter 72 during the second count cycle, and starting with the first word for the closest range bin, transfer that word to hit detector 76.

Figure 5:
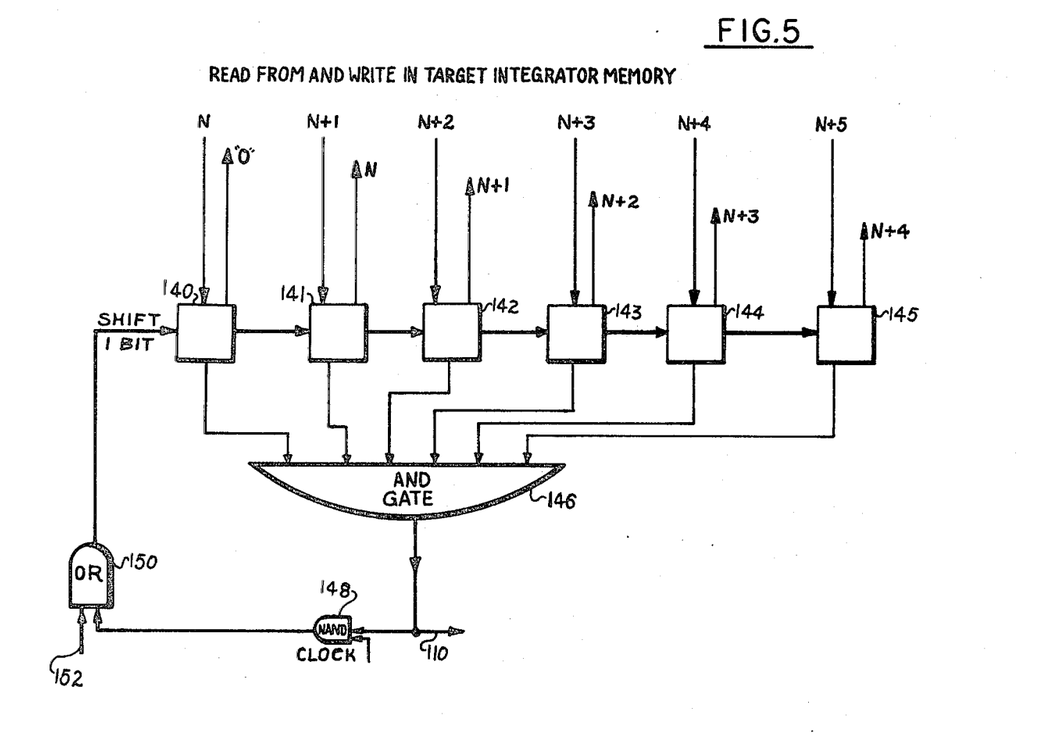
FIG. 5 is a schematic block diagram of the hit detector of FIG. 3.

Hit detector 76 is shown in FIG. 5 to comprise six registers 140 to 145 connected serially as a six-stage shift register. The bits from the memory word being transferred, respectively those of the most recent sweep to the oldest sweep, are fed in on the appropriate lines N to N+5 to the respective registers 140 to 145. The AND gate 146 is connected to the outputs of each of the six registers to determine the presence in registers 140-145 of six detected echo signals, in order to determine a "hit." For simplicity, the embodiment described herein employs a hit detector 76 of the form which requires, for determination of a hit, that there be a detected echo signal in a particular range bin for six consecutive azimuth bearings by means of AND gate 146. As explained below, a majority logic configuration may be used in hit detector 76, thereby requiring for hit detection an optimal majority count of detected echo signals in six successive azimuths, for example, 5 of 6.

The output of gate 146 is a "hit signal" on line 110. In the case where gate 146 determines that fewer than six of the bits stored in registers 140-145 represent detected echo signals, the hit signal on line 110 together with the clock signal is effective in AND gate 146 to generate a pulse signal which is passed by OR gate 150. The output of gate 150 is effective to shift the information in shift registers 140 through 145 to the adjacent register stages 141 through 145, respectively, which action dumps the bit stored initially in register 145 and puts a "0" in register 140. The bit shift operation further is effective to transfer the thus shifted information from registers 141 through 145 back to target integrator memory 64 in the second through the sixth bit of the memory word under examination, which is the one corresponding to the range indicated by counter 72. In the case where gate 146 determines that all 6 bits stored in registers 140-145 represent detected echo signals, the hit signal on line 110 is effective to disable gate 148.

In the meantime, the hit signal on line 110 is effective to cause the azimuth and range coordinates corresponding to the hit to be stored in the noise cancellor memory 114, as described hereinafter, for further analysis. At the completion of the storage cycle in memory 114, a pulse signal is returned via line 152 and passed by OR gate 150 which is effective to shift the data stored in registers 140-145 in the same manner as hereinbefore described in response to the pulse signal generated by gate 148. Successive clock pulses during this second count cycle of counter 72 are similarly effective to process the corresponding 6-bit words in target memory 64 to produce resultant hit and miss signals on line 110. The six azimuth bearings encompassed by the stored 6-bit words correspond to a beamwidth of the antenna. The azimuth coordinate corresponding to the six sub-segment beamwidth is defined to be the azimuth value of the present frame less three. The present frame sub-segment value is maintained by sub-segment azimuth register 66.

The signal on line 110 enables gates 78 and 82 (FIG. 3) to pass respectively the sub-segment azimuth established in register 66 as a 12-bit binary word representing the sub-segment azimuth for the hit analyzed in detector 76, and the corresponding actual range count established in counter 72, the latter as an 8-bit word. The azimuth and range words are combined as 20-bit hit data words in hit register 80. The hit data words are determined within a frame in ascending order of azimuth and for each azimuth in ascending order of range so that they can be appropriately processed and compared thereafter in other circuitry.

Figures 8, 9A:
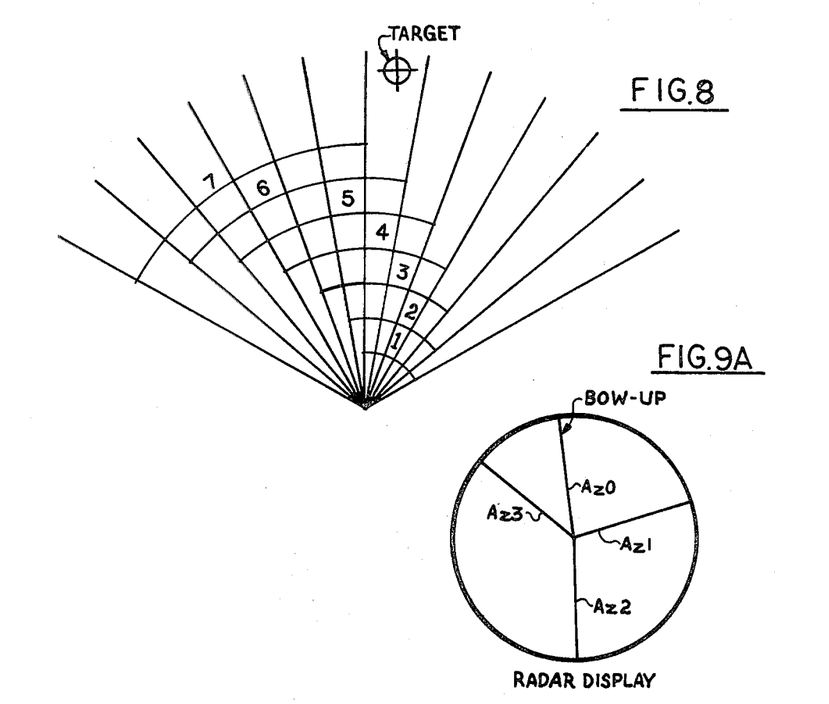
FIG. 8 is a schematic diagram used in explaining one aspect of this invention.
FIGS. 9A and B are schematic diagrams used in explaining another aspect of this invention.

The effect of the hit detector operation can be appreciated by reference to the schematic diagram of FIG. 8. In that diagram, a target is shown in its schematic relation to the orientation of the antenna in seven successive positions indicated by seven different arcs that are successively numbered. Each arc encompasses 6 sub-segments of azimuth which represent the region illuminated by the antenna in any one position thereof; each segment corresponds to a radar pulse which is transmitted with the antenna in the associated position. Thus the arcs numbered 1–7 are representative of azimuth regions illuminated by seven successive radar pulses. In the diagram of FIG. 8, the target is shown to be illuminated by the radar pulses for arcs 1–6, but not by radar pulse for arc 7. Thus, in the operation of hit detector 76, an echo signal is returned at the associated range of that target for each of the radar pulses of antenna positions 1–6. Accordingly, the AND gate 146 detects coincidence of the echo for the target for those six echo pulses in the same range bin word and provides a hit pulse accordingly on line 110 representing that coincidence. The azimuth assigned to that hit position for the coincidence is the central azimuth, which is developed by subtracting three from the actual azimuth in register 68, as explained above in connection with register 66.

Figure 7:
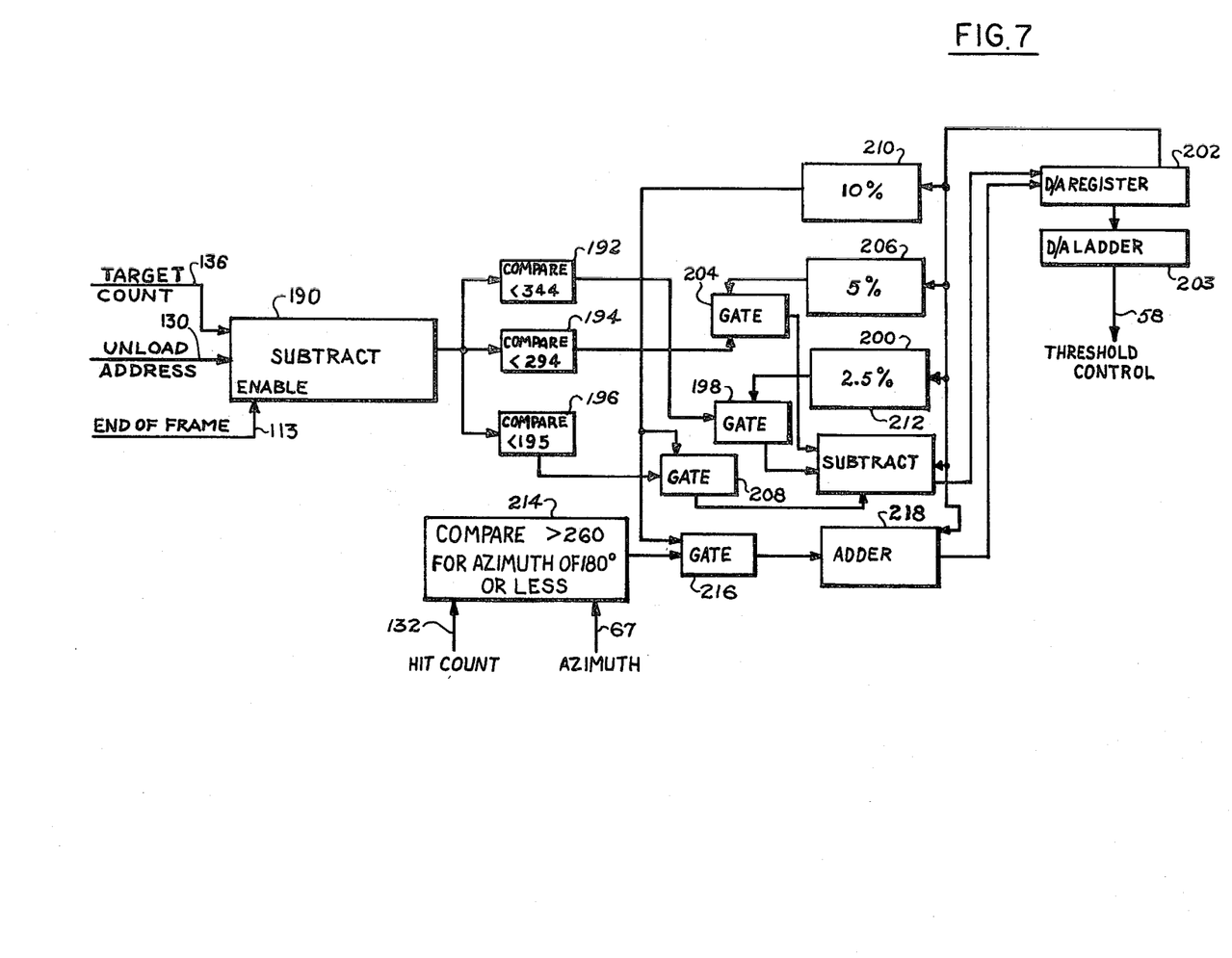
FIG. 7 is a schematic block diagram of the control threshold logic of the radar unit of FIG. 1.

For the seventh radar pulse illustrated in FIG. 7, the target is not illuminated and there is no associated echo pulse therefor. Accordingly, with the operation of hit detector 76 for the six radar pulses in antenna positions 2 through 7, there is no coincidence in AND gate 146, and a hit is not registered. Where the gate 146 is a majority gate, for example, where the operation is to provide a hit signal where any five of the six inputs are binary "1" echo signals, a hit is developed for the operation of the echo pulses of positions 2–7 as well. However, as explained hereinafter, the actual development of "valid target" signals from the "hit" signals requires further analysis.

The use of the technique of hit detector 76 (as illustrated in FIG. 8) increases the confidence level substantially of the azimuth values assigned to the bits. In effect, there is a six-fold redundancy in the hit detector process which increases the probability that a target detected by detector 76 is indeed due to an echo signal, rather than random noise. For operation in low signal-to-noise environments, the probability of detection of a true target may be further increased by using a majority logic gate in hit detector 76.

Figure 4:
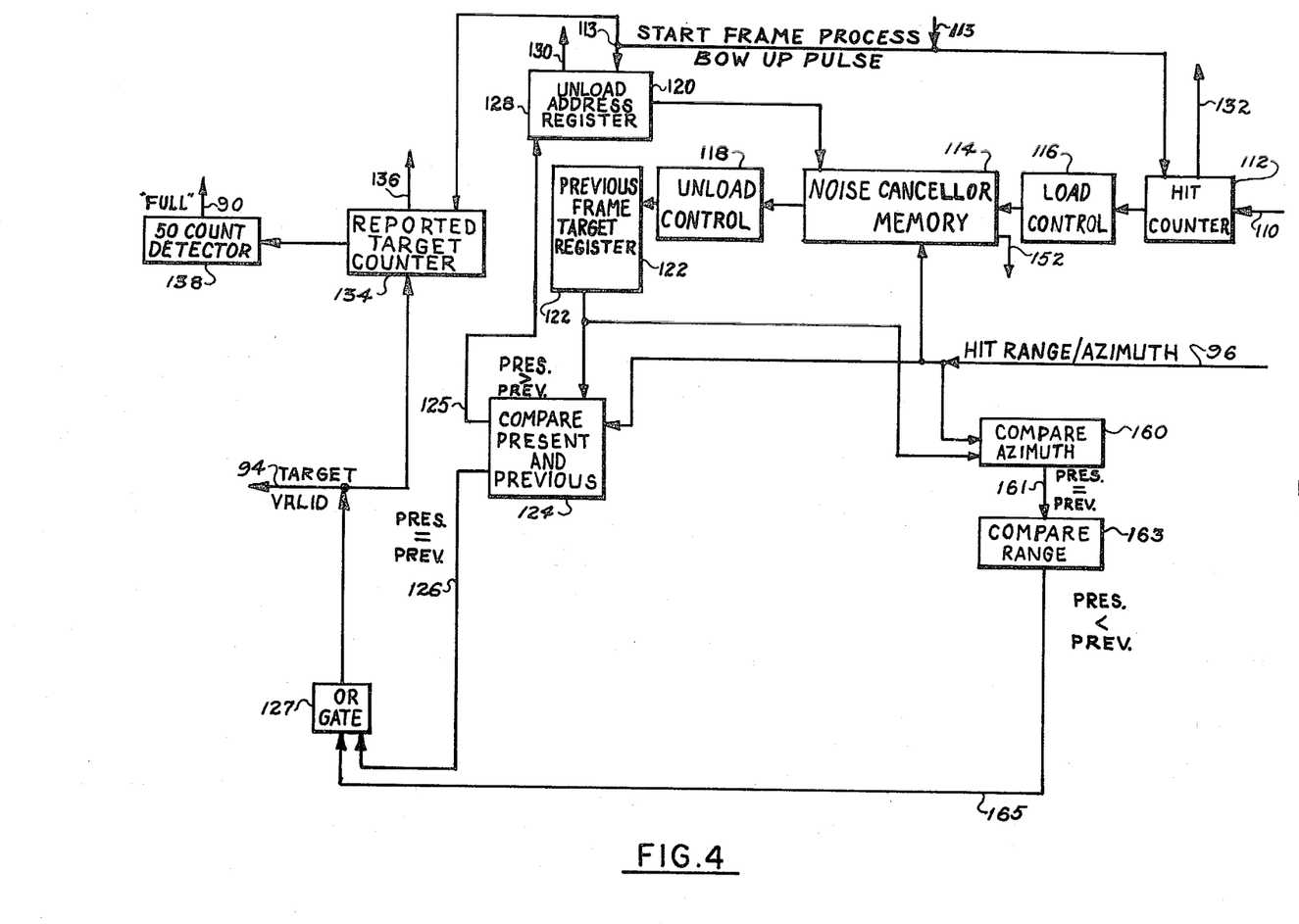
FIG. 4 is a schematic block diagram of the noise cancellor memory and related portions of the radar unit of FIG. 1.

The data words for the hit signals established in register 80 are passed by gate 81 under control of an excess hit detector 84. The detector 84 counts the hit signals for each azimuth generated on line 110 by hit detector 76, and when the count does not exceed six the gate 81 is enabled; but when the count does exceed six, the gate 81 is disabled, and an "excess" signal is developed on line 105 which is ultimately transmitted with the data via a multiplexer 102 and transmitter 104 to the central stations. The detector 84, a counter, is reset at the beginning of each azimuth by the radar pulse so that it provides a separate count of hits for each azimuth; thus the gate 82 does not pass the data for more than six hit signals at each azimuth. Thereby, the target data ultimately requiring analysis and transmission to the central station for processing is reduced by excluding from subsequent target analysis processing all hit signals at each azimuth which indicate possible targets beyond the nearest six hits. The hit data is passed by another gate 86 under the control of the signal developed on line 94 from logic circuits shown in FIG. 4. These circuits perform an analysis of the hit data and, upon determination that the hit data represents a valid target, apply a "target valid" signal via line 94 to enable gate 84. Thus, the azimuth-range data passed by gate 86 represents valid targets. This set of data is supplied to a target memory 98 via a load control circuit 96 which operates to feed the target into one or the other of two sections of the memory 98. The memory 98 temporarily stores the data (for up to 50 targets) of an entire frame and, when the frame processing is complete, the data from memory 98 is unloaded via control 100 and supplied to the multiplexer 102 for transmission to the central unit. The arrangement of the memory 98 in two sections permits the loading of one half of it while the other half is being unloaded for transmission; such loading and unloading occur at different rates within a frame. Lines 105, 106, 107 and 108 provide multiplexer 102 with inputs respectively indicating excess hits for a given azimuth, the "full" state of the target memory 98, the radar pulse repetition rate, and the radar pulse width.

The hit data passed by gate 82 is supplied, via line 96, to a noise cancellor memory (FIG. 4), into which it is loaded under the control of load circuit 116. The loading is at addresses established by a hit counter 112, which counts the hit signals established on line 110. The memory 114 has an unload control 118 which supplies previously loaded signals from memory 114 to a register 122 from addresses established in unload register 120. The cancellor memory is one preferably formed in several sub-sections so that the loading can take place at one section while unloading is taking place at another section and the unloading is in the sequence under which the data was previously loaded; that is, first in, first out. With this arrangement, the cancellor memory 114 contains the data for hit signals form two successive frames, and thereby the data of the hits for the current frame can be compared with the corresponding data for similar azimuths of the previous frame. In comparator circuit 124, the hit data for the current frame being loaded in memory 124 from line 96 is compared with a correspondingly associated hit data word which is established in the previous frame register 122; that is, the hit word stored in that memory the longest is the word being compared with that hit word currently supplied on line 96. The comparison performed by circuit 124 is such that if the binary value of the word formed by the combined azimuth number and range of the present frame's hit is less than the corresponding value for the word being compared from the previous frame supplied from register 122, then the circuit ignores that present frame's hit word and supplies no output. The same previous frame word is then compared with the next data word from line 96 and, if the present frame binary value is greater than the previous frame number, a signal is developed on line 125 to step the count output of unload register 120. Unload control 118 is effective to read out the next previous frame word from memory 114 into register 122 for comparison with the hit data then established in comparator 124. This operation is repeated until the comparison performed by comparator 129 determines that either of two states occurs: first, the binary value of the present frame word is less than that of the previous frame word, in which case the current hit data is discarded for the succeeding one to complete the operation, or, second, until the binary value of the present frame word is equal to that of the previous hit word, in which case an output signal on line 126 is supplied via OR gate 127 to line 94. The second state thereby establishes a "target valid" signal for enabling gate 86 to pass the hit data of the present frame to the target memory 98 for transmission back to the central control.

Figure 6:
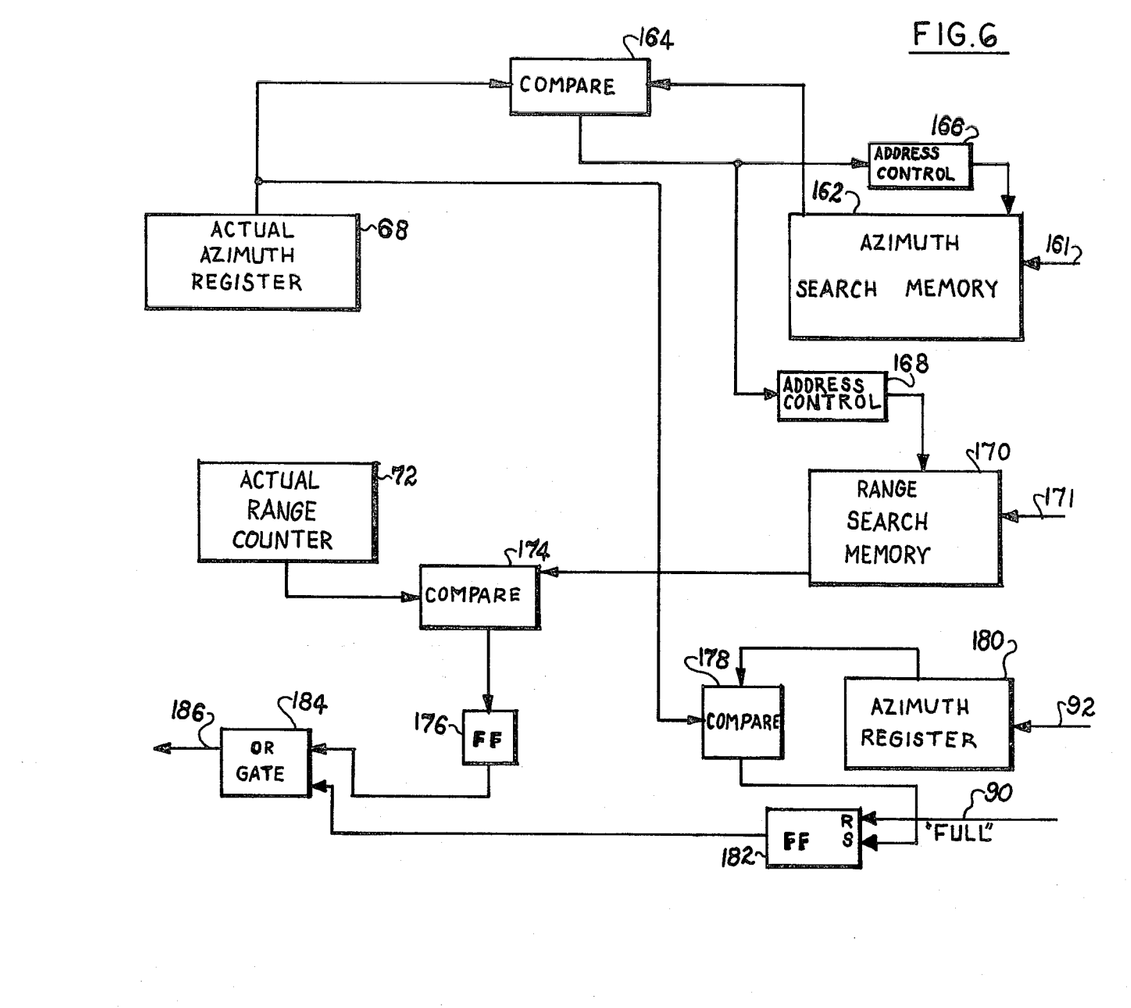
FIG. 6 is a schematic block diagram of the control search and related portions of the radar unit of FIG. 1.

The operation of the noise cancellor memory 114 being described above commences during each frame with the start-of-frame process, which occurs at the "bow-up" pulse of the radar antenna indicating the "0" azimuth reference. The "bow-up" pulse is supplied via line 113 to reset register 120 and register 112. At this point the memory 114 begins the process of loading the hit data of the present frame as they occur and unloading the hit data of the previous frame for comparison in circuit 124, as explained above. As explained hereinafter, the load and unload rate for this memory is approximately constant on the average since, as described hereinafter with respect to FIG. 6, no more than 50 valid target signals are permitted to accumulate during each frame and, further, a feedback control system, described hereinafter with respect to FIG. 7, is effective to adjust the detection threshold established by circuit 52 at such a level that a certain number of false alarm hits are detected during each frame. An additional limiting effect on the number of hit signals is the operation of the detector circuit 84 which limits the number of hits to six for any particular azimuth, as explained above. However, the actual load and unload rates are not exactly the same due to the randomness of the occurrence of hit signals due to noise. The memory 114 provides sufficient storage capacity to accommodate variations anticipated in this load and unload rate from frame to frame. The memory 114 may be a type with a microsecond cycle time so that the fast operation (for example, hundreds of nanoseconds) of the hit detector 76 of FIG. 5 is effectively controlled by the write cycle of the cancellor memory 114. A pulse is generated by memory 114 at the end of the write cycle on line 152, following the determination of a hit by detector 76, as described with reference to FIG. 5.

The target validity determination just described, the noise cancellor memory and associated circuitry are effective to identify as a target signal within a frame any hit signal corresponding to a particular set of azimuth and range coordinates, which coordinates are identical to those of a hit signal detected in the previous frame; that is, an echo signal from a target must occur for two successive frames at the same azimuth and range to be identified as a valid target. In the case of a target within the sector illuminated which is moving with respect to the mobile radar station, the azimuth and range coordinates of such a target, as derived from the hit signal, may differ over a two-frame period, depending on the relative velocity of the target and the size of the target. By way of example, this situation might occur for a target with physical dimensions such that an echo signal is returned only for a single azimuth and the echo signal falls completely within one range bin; thus a single azimuth and range coordinate determines the target location. Further, this target might be moving with a relative velocity which is radially directed to the radar antenna. In a case where the velocity of the target is sufficiently high so that, during the interval between the radar pulses at the target azimuth of a first and a second frame, the target moves closer to the radar station to such an extent that the corresponding second frame echo signal falls completely within the next smaller range bin as compared with that signal at the first frame, then the noise cancellor memory will reject the second frame hit signal as a false alarm. This follows since there would not be a hit signal during the second frame having both the same azimuth and range coordinates as the hit signal of the first frame. Moreover, a target moving with a radially closing relative velocity in excess of that just described will also result in the corresponding echo signal being rejected by the noise cancellor memory as a false alarm, for the same reasons. This range of target velocities is termed blind velocities. Calculation of the minimum blind velocity for a particular vessel being tracked by a mobile radar unit may be shown by way of example. For a ship having a length of 100 feet, and moving with a relative velocity toward the radar station, the minimum blind velocity equals the quotient of the ship's length divided by the antenna frame period. Assuming a frame period equal to three seconds, the minimum blind velocity for this ship would be 33⅓ feet per second, or 20 knots.

In a collision avoidance system, it is of critical importance that the echo signals corresponding to such a target be correctly identified as a valid target signal since the closing radially directed relative velocity indicates that the target is on a collision course with the mobile radar station. It is possible, of course, that the exemplary target described above could move radially away from or circumferentially around the station at such a rate that the system would be "blind" to the target, e.g., if the target azimuth remained constant while the range increased, or the target azimuth varied while the range remained constant, respectively, over a two-frame period. However, these cases are not important since such target movement would not result in a collision course with the mobile station. If the target is moving radially toward the radar station at a rate slower than a blind velocity, then the noise cancellor memory is capable of directly determining that the corresponding signal is a representative of a valid target, although the effective size of the target reported is reduced in proportion to the ratio of the actual radial velocity to the minimum blind velocity.

The present invention is effective to detect such a target moving at a blind velocity as discussed hereinbefore, and on a collision course with a mobile radar station. At the same time that comparator 124 is performing a target validity comparison for stationary targets, comparator 160 is effective to compare the azimuth portion of a present frame hit signal with the hit signals from the previous frame stored in noise cancellor memory 114, as said signals are transferred to register 122, as discussed hereinbefore with respect to the noise cancellor memory 114 operation. Upon determination by comparator 160 of a match of the azimuth values of a present and previous frame hit signal, the respective range portions are compared in comparator 163, which receives the range data of the present and previous frame words via line 161. If the present hit signal is determined to have a smaller range than that of the previous frame, and thus a closing collision course is indicated, a "target valid" signal is passed on line 165 by way of OR gate 127 and line 94 to enable gate 84 to pass the 20-bit azimuth and range word stored in hit register 80 to be stored in target memory 98 to be subsequently transmitted to the central control 36. This pulse on line 165 thus indicates that a target is on the same azimuth as a previous frame but that the target is at a closer range so that it would appear to be on a collision course with the mobile station. This data would then be identified by the central control as indicating a dangerous situation under appropriate circumstances.

During a frame, a count of valid target signals on line 94 is accumulated in target counter 134, this counter being reset by the bow-up pulse on line 113 (FIG. 4) and the count output is supplied via line 136 to a subtractor 190 (FIG. 7). The count output of unload register 120 at the end of a frame is supplied via line 130 to subtractor 190 in response to the bow-up pulse on line 113. Thus, at the time of the bow-up pulse, the count on line 130 represents the total number of hits of the frame just completed, and the count on line 136 represents an on-line count of the number of valid targets reported in the current frame. This difference provides a measure of the false alarms that are occurring during the current frame. In one form of the invention, the parameters that are established are such as to provide approximately 430 false alarms per frame which, together with a possible 50 valid targets, provides a maximum number of hits per frame of around 480. Thus, output from subtractor 190 provides a measure of the false alarm detection rate that can be used as a feedback control to adjust the detection threshold level in comparator 52 (FIG. 2) to establish approximately the desired number of false alarms that are occurring. The signal on line 58 that is used as the feedback adjustment of the threshold level in comparator 52 is derived from a digital-to-analog converter formed by the blocks 202 and 203 which are respectively a register and a digital-to-analog ladder circuit. The control signal for line 58 is established in binary form in register 202 and the modification thereof takes place in one of four possible paths, three of which depend upon the output of the subtractor 190. More particularly, if the output of subtractor 190, corresponding to the number of false alarms detected in a frame, is less than 344 but more than 295 (for one set of parameters of this invention), then comparator 192 provides an enabling signal for gate 198; if less than 294, but more than 196, then comparator 194 provides enabling signal for gate 204, and if less than 195 the comparator 196 provides an enabling signal for gate 208. These gates in turn pass, respectively, certain percentages of the binary number established in register 202 via circuits 200, 206 and 210, corresponding to the values 2.5, 5 and 10 percent, respectively. These values are passed into a subtractor 212 which also receives the binary form of the feedback control signal from register 202, whereupon the difference between these values is determined and the result is stored in register 202 to establish the new feedback control signal for the threshold circuit 52. The fourth path for modification of the feedback control signal includes comparator 214 which receives the hit count on line 132 from the output of counter 112 (FIG. 4), as well as the actual azimuth on line 67 at the output of register 68 (FIG. 3). Thus, comparator 214 continuously receives during a frame the hit count and the azimuth, and is effective to determine if that hit count is greater than 260 for an azimuth of 180° or less. In a case where the hit count does exceed 260 prior to reaching an azimuth value corresponding to 180°, comparator 214 provides an enabling signal for gate 216 to pass 10 percent of the current threshold value in register 202, as provided by circuit 210, to adder 218 whose output is stored in register 202, to increase that control signal value. This value determines the new analog feedback value passed via line 58. Thus, in these circumstances, the detection threshold is recognized to be too low since there are too many hits in a half frame, and said threshold is adjusted by an increase of 10 percent, a relatively coarse step-up. To compensate for an over-adjustment, the corresponding reduction in threshold level is via the other three paths of adjustment, namely, comparators 192, 194 and 196. The overall effect is that, during a frame, if the number of false alarms is greater than 344, there is considered to be an adequate number of false alarms (that is, the existing threshold is within 2.5 percent of the desired threshold) and no change is necessary, but if fewer than 344 false alarms occur, then the adjustments are of the nature described above.

As noted above, the search control 42 in the central control 36 can be used by an operator to set, for an angular sector bounded by a pair of azimuths, a minimum and maximum range limit to be used by the mobile stations to search for valid targets. For example, as shown in FIG. 10, the area of interest for target search lies within the shaded sectors, and the areas known to produce high density noise or target signals, such as the shore areas and the central area immediately around the ship, are not of interest in the radar search. In ship collision avoidance applications, echo signals resulting from shore, and signals from the region 163 immediately surrounding the vessel are not generally of interest, although both such signals result in high density target information. Since the ship orientation with respect to shore, once known, changes relatively slowly, the shore echo signals are of little use in preventing collision, at least as respecting those echoes corresponding to land points beyond the immediate shore. Echo signals resulting from the immediate area surrounding the vessel are generally representative of high clutter due to waves and the like. The operator of central control station 36 can establish parameters for sectors such as those shown in FIG. 10 by establishing the azimuths and ranges that form each sector. For example, the sector at the top of FIG. 10 is formed by the azimuths $A_6$ and $A_7$ together with the ranges $R_0$ and $R_7$. In similar fashion, each of the other sectors is formed by two azimuths and an outer range as well as by the inner range of $R_0$. Once the operator knows the ranges and azimuths that he wishes to enter, he establishes them by setting up a sequence going clockwise of an azimuth and an associated inner and outer range, the next azimuth and the associated inner and outer range, and so on. Generally the minimum range limit, $R_0$, will be set so as to correspond to all azimuths. These parameters in binary coded form are transmitted via search control 42 and channel 34 to the control search logic shown in FIG. 6. These binary data are established on lines 161 and 171 in the form of a sequence of azimuths and a sequence of ranges, and are stored, respectively, in an azimuth shift search memory 162 and in a range memory 170.

A comparator 164 receives the actual azimuth from register 68 together with the first sector azimuth limit (e.g., azimuth $A_7$ in FIG. 10) established in the output of azimuth memory 162, going in the direction of the antenna rotation. When a coincidence is established by comparator 164, a first address control 166 is effective to transfer to the output of memory 162 the next sector azimuth limit of the search (e.g., azimuth $A_1$ in FIG. 10), and a second address control 168 steps the range search memory 170 to transfer the associated minimum and maximum ranges (e.g., ranges $R_0$ and $R_1$ in FIG. 10) to the output of that memory where they can be compared in comparator 174 with the actual range established in counter 72. When a coincidence is established by comparator 174, the state of flip-flop 176 is changed and the flip-flop output is passed via OR gate 184 to line 186. When flip-flop 176 is in the "0" state, the signal on line 186 disables gate 62 (FIG. 3) and, when flip-flop 176 is in the "1" state, that signal enables gate 62. Thereby, detected echo signals on line 60 are not passed to the target integrator memory 64 (FIG. 3) except when flip-flop 176 is in the "1" state. At each azimuth, when range counter 72 output matches the minimum range from memory 170, then comparator 174 changes flip-flop 176 to the "1" state, thereby enabling signal processing of the received echo signals corresponding to greater ranges. Range counter 72 continues to increment and the count output eventually matches the value of the next maximum range in the memory 170, whereupon comparator 174 detects the coincidence and changes flip-flop 176 to the "0" state, thus disabling the signal processing of echo signals. The flip-flop 176 remains in the "0" state until, during the next sweep, the minimum range for that azimuth (corresponding to the output of memory 170) is reached by counter 72. In this manner, the target analysis of echo signals is restricted to those signals corresponding to targets within the range limits for the various sectors determined by search control 42 of control station 36, and all targets in areas not of interest or areas of very high target density which are likewise without interest are not received by the target integrator memory 64 and are not processed.

As indicated above, the system establishes a limit to the number of valid targets that may be transmitted back to the central control station 36 during a single frame. The limit may be a certain number such as 50 in the embodiment shown in the drawing. For this purpose, the count established in target counter 134 (FIG. 4) is monitored by count detector 138 and when a count of 50 is there established, an output enabling signal on line 90 representing "full" memory is applied to gate 88. Gate 88 is effective to pass the azimuth portion of the hit data from register 80 to azimuth register 180. Thereby, the azimuth for the then processed hit is identified as the azimuth corresponding to the 50th valid target of that frame and is stored in azimuth register 180 (FIG. 6) for subsequent processing. In addition, this "full" signal on line 90 resets flip-flop 182 to the "0" state, the output of which is passed by the OR gate 184 to line 186 to provide an inhibit signal for track limit gate 62 (FIG. 3). Thus, once 50 valid targets have been detected and stored for a particular frame, no further processing of echo signals goes on in the system. On the next frame operation, flip-flop 182 remains reset and thus no processing occurs until the azimuth stored in register 180 is reached by counter 68.

Figure 9B:
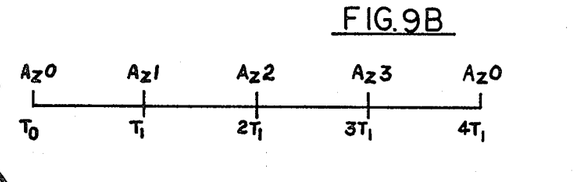

During the succeeding frame, as the azimuth in register 68 is less than that in register 180, the flip-flop 182 remains reset. When coincidence is established between the azimuth of the current frame in register 68 with that of the preceding frame in register 180, comparator 178 supplies a set signal for flip-flop 182 to set it, thereby removing the inhibit signal from line 186 and opening the track limit gate 62. Thereby, gate 62 is enabled to pass echo signals to the target integrator memory 64 and to renew the signal processing. That is, the processing is initiated starting with the azimuth from which it was terminated in the preceding frame. This operation is illustrated in FIG. 9 for a situation in which four sectors are transmitted over four frames to provide all of the targets within the surrounding search area.

During a first frame starting at azimuth $A_0$, the radar system is effective to detect 50 valid targets. In accordance with FIG. 9A, the 50th target detected in the first frame is determined to be at azimuth $A_1$. At this point in time, the target detection function of the system is inhibited for the remainder of the first frame, and the azimuth and range coordinates of the 50 targets thus far detected are transmitted to control station 36. During the second frame, the target detection function of the system remains inhibited until the azimuth of the radar antenna equals azimuth $A_1$, whereupon the target detection circuitry is enabled. FIG. 9A indicates that during the second frame a 50th target is detected at azimuth $A_2$. At this time, the target detection function is disabled for the remainder of the second frame, and the azimuth and range coordinates of the targets detected in the second frame are transmitted to control station 36. During a third frame, the target detection function remains disabled until the azimuth of the antenna equals azimuth $A_2$, whereupon target detection is performed again until the 50th target in this range is determined to be detected at azimuth $A_3$. At this point, target detection is discontinued until during the fourth frame azimuth $A_3$ is reached, and the data for the 50 targets detected and transmitted to control station 36. In sectors from azimuths $A_0$ to $A_1$ to $A_2$ to $A_3$, as indicated in FIG. 9A, 150 valid targets were detected during three successive frames. In a similar manner, during a fourth frame period the remaining targets are detected, to provide data for a complete 360° about the mobile radar station. If the fourth sector contains more than 50 targets, then that sector will similarly terminate at the detection of the 50th target and a fifth sector will be necessary to complete the 360° scan. Thus, the system is effective to develop the data for regions with a high density of targets. However, the actual quantity of data that is transmitted at any time period is limited to suitable amounts.

As noted above, the probability of detection may be increased by using a majority organ for gate 146. That is, for more remote targets, the linear dimensions for the angle of illumination by the radar pulse becomes large, and consequently, the azimuthal resolution is reduced as a function of range, and the signal-to-noise ratio is lower. Also as a function of range, under such conditions of remote targets with a low signal-to-noise ratio, it has been found that a majority organ for gate 146 based on five echo signals out of the six inputs results in better target detection than six out of six (that is, a better probability of detection at a certain signal-to-noise value with a particular value of false alarms). However, target detection is reduced under certain conditions of lower signal-to-noise ratio, when it is based on less than 7 out of 10; optimum detection, it has been found, occurs for low signal-to-noise conditions based on a system that ranges from about 7 to 8 out of 10. The larger the number of sub-segments (or radar pulses) in the unit beamwidth that are used, the greater potential of accuracy of the azimuth measurement. However, because of the noise, a reliance for detection on an $m$ out of $m$ system tends to result in a failure to detect hits, which would be more likely detected in a system of n out of m, where n is less than but close to m. Thus, the majority logic gate 146 has an optimum basis of n out of m, as noted above, to achieve two functions; one being the probability of detection of targets, and the other being to improve the azimuth reporting resolution of those detected targets. As n increases toward m, the reliability increases of reporting the azimuth as the middle value of the n values. However, in conditions of low signal-to-noise, the confidence in detection increases with n up to some value less than m, as explained above, and becomes the determinative factor.

The effect on target detection of the hit detector 76 and of the logic associated with the noise cancellor memory 114 may be analyzed by considering the respective probabilities of detection of a true target and of noise at the various portions of the system. For example, at the output of threshold comparator 52, the probability of detecting a target, at some signal-to-noise ratio, is about 0.9, and that of noise is a constant value determined by the threshold, say 0.1. These values provide a discrimination ratio of one to the other of 9, which may be used as a figure of merit. The effect of the 6 out of 6 AND gate 146 is to raise each of those probabilities to the sixth power resulting in a much improved discrimination ratio between target and noise of $(0.9)^6/(0.1)^6$, approximately equal to
$$0.6/10^{-6} = 6 \times 10^5.$$
The noise cancellor logic has the effect of squaring the respective probabilities of target and noise detection as developed by the hit detector, so that the discrimination ratio is further improved: $(0.6)^2/(10^{-6})^2 = 0.36 = 10^{12}$.

Thus, the operation of the hit detector and noise cancellor has the effect of reducing the individual probability of detection of target and of noise. But the relative discrimination against noise is much greater than against target signals, resulting in an improved figure of merit.

The use of the hit detector and noise cancellor memory logic to develop target valid signals and to digitize the azimuth and range of those signals in combinatorial form results in a substantial reduction of the amount of information that must be transmitted by each station via a radio communications channel used in common with other stations. That is, the digitized target data of a limited number of targets (at most 50 targets and often less) is substantially less than the table of echo signals, hits and misses which are developed in 256 range bins over each frame of 480 azimuth subsegments in the illustrative embodiment described above.

Various modifications of this invention will be apparent to those skilled in the art from the above description. This invention is not limited to any particular type of circuitry, suitable, varied forms of which will be apparent from the above description.

Thus, a new and improved radar system is provided which is especially suitable for collision avoidance. The radar equipment required at each mobile station is reasonable in its extent, and the bandwidth requirements for the transmission of target data, by all of hundreds of such stations, may be practically realized over a shared communications channel to a remote central computer. The azimuthal resolution is an optimum for a given antenna beam, and target signals are effectively detected and spurious detection tends to be eliminated.

What is claimed is:

1. In a radar system, a plurality of moving radar stations and a central data processing station, in which each moving station develops target information and transmits the target information to the central data processing station over a time-shared communications channel, and in which each radar station includes a memory device for retaining target data to be transmitted to the central station;

the method of developing target data in high density target areas for each of said moving stations, comprising the steps of:

a. developing said target data during each target frame in moderate density areas and transmitting the developed data to the central station;

b. during each target frame in high density areas, detecting when the target storage device is full of target data, and registering the azimuth at which the memory device becomes full and transmitting the target data from an initial azimuth until the memory-full azimuth;

c. and following thereupon during the next frame, storing target data starting with the memory-full azimuth and continuing on therefrom and storing the target data for transmission to the central station until the memory device becomes full or the frame is completed;

whereby in high density areas target data is fully developed in surrounding regions over a plurality of frames.

2. In a radar system, a plurality of moving radar stations and a central data processing station, in which each moving station develops target information and transmits the target information to the central data processing station over a time-shared communications channel, and in which each radar station includes a memory device for retaining target data to be transmitted to the central station;

the method of developing target data in high density target areas for each of said moving stations, comprising the steps of;

a. developing said target data during each target frame in moderate density areas and transmitting the developed data to the central station;

b. during each target frame in high density areas, detecting when the target storage device is full of target data, and registering the azimuth at which the memory device becomes full and transmitting the target data from an initial azimuth until the memory-full azimuth;

c. and following thereupon during a succeeding frame, storing target data for azimuths after the memory-full azimuth for transmission to the central station until the memory device becomes full or the frame is completed;

whereby in high density areas target data is fully developed in surrounding regions over a plurality of frames.

3. The method of claim 2 wherein step *a* is performed by deriving said target data within areas defined by certain ranges and azimuths.

* * * * *